INVENTORS.
DAVID E. CHRISTIE
KARL E. WINQUIST
BY

ATTORNEYS

INVENTORS.
DAVID E. CHRISTIE
KARL E. WINQUIST
BY
Reynolds & Christensen
ATTORNEYS INVENTORS.
DAVID E. CHRISTIE
KARL E. WINQUIST
BY
Reynolds & Christensen
ATTORNEYS INVENTORS.
DAVID E. CHRISTIE
KARL E. WINQUIST
BY
Reynolds & Christensen
ATTORNEYS

United States Patent Office 3,344,591
Patented Oct. 3, 1967

3,344,591
MOVING CARRIAGE MECHANICAL BERRY HARVESTER WITH ROTATIONALLY OSCILLATIVE SHAKERS
David E. Christie and Karl E. Winquist, Portland, Oreg., assignors to OECO Corporation, Portland, Oreg., a corporation of Oregon
Filed Apr. 27, 1964, Ser. No. 362,611
18 Claims. (Cl. 56—330)

This invention relates to improvements in berry harvesters generally of the type disclosed in our copending patent application Ser. No. 319,249, filed Oct. 28, 1963, and is directed more particularly to improvements in the construction and operation of the berry-dislodging shaker mechanism therein. A broad objective hereof is to provide a practicable and efficient mechanical harvester for the large-scale harvesting of raspberries, loganberries, and similar cane or vine type berries which are planted in rows and grow or are trained for generally upright growth. The invention is herein illustratively described by reference to the presently preferred embodiment thereof; however, it will be recognized that certain modifications and changes therein with respect to details may be made without departing from the essential features involved.

It is well recognized that there has been a significant need for effective mechanical harvesting devices for the above-described application. Hand picking is very slow and expensive. Labor shortages during the height of harvest seasons have created grave problems for a number of farmers. Many persons have attempted to devise practical mechanical harvesters but their proposed machines have presented such problems as excessive plant damage, incomplete removal of ripe berries, dislodgment of underripe berries, mechanical difficulties, nonreliability, and lack of versatility to match the variable conditions encountered in the field.

With these former difficulties in view, a main object hereof is to devise a more efficient shaker mechanism for a carriage type mechanical harvester which will selectively dislodge the ripe berries without dislodging underripe berries or damaging foliage or vines, and which will apply its vibrative forces to all portions of the plants with a high degree of uniformity throughout so as to avoid skips during traversal of the plants by the harvester.

Still another object hereof is to devise, in a carriage-type mechanical harvesting machine, a shaker mechanism so constructed and arranged and so operated that the power required to operate it and the strength of the mechanical structure required to support and drive it may be held at a minimum, thereby to limit the weight, prolong the trouble-free life and reduce the cost of constructing and operating the machine. A related object is to devise a vibration type shaker mechanism in which the plant-engaging shakers may be made sufficiently large to harvest from even the largest plants, (i.e., high growing and heavily foliated) without generating objectionable vibration forces transmitted from the shakers to and through the frame of the machine. Consequently, crystallization and failure of supporting parts and structures are avoided and former structural design and maintenance problems are thereby greatly alleviated.

Still another object hereof is to devise such a harvester in which the drive for the novel shaker mechanism is readily adjustable to vary both the speed and the amplitude of vibrations applied to the plants, as necessary in order to achieve complete yet selective dislodgement of the ripe berries under varying harvest conditions (i.e., moisture, type of berries, type of growth, etc.).

A further object hereof is to devise a shaker assembly of relatively inexpensive, durable, light-weight construction, and one in which the shaker fingers are readily and quickly installed and removed at will.

As herein disclosed, each shaker mechanism in the harvester includes a revolving upright tubular member carrying a plurality of shaker fingers projecting radially therefrom at locations distributed over its length and circumference. These fingers project into the foliage of the plants during progressive advance of the harvester along the plant row and cause progressive rotation of the shakers at the speed of travel. An important contribution of this invention is to superimpose upon the progressive free rolling or revolving action of the shaker assembly a high-speed rotative oscillatory motion which causes the shaker fingers to vibrate rapidly directionally in a circumferential sense transversely to their own length and in their plane of rotation about the shaker axis. By establishing the vibrational amplitude at a fraction of an inch with the vibrational frequency at about 1,000 cycles per minute, more or less, ripe berries are selectively dislodged under average harvest conditions. A greater or lesser vibration amplitude and/or frequency may be established for other harvest conditions by making field adjustments in the shaker drive mechanism.

In the preferred embodiment, and in accordance with still other more specific features hereof, the shaker mechanism comprises first and second rotational members which are coaxial with the rotary shaker, a means for oscillating the first member rotationally, and transmission means carried for bodily rotation by the second member and rotatively interconnecting the shaker and the first member so as to transmit the first member's vibrations to the shaker accompanying rotation of the shaker. As illustrated the first member comprises a sun gear which is rotationally oscillated about a given position through the action of a crank mechanism driven by an eccentric. The transmission means carried for bodily rotation comprises planet gears of a planetary transmission, such planet gears engaging the sun gear and in turn meshing with a ring gear carried by the tubular base member or drum of the shaker assembly. Thus as the shaker drum revolves during advancement of the harvester, the ring gear rotates with the shaker drum and the planet gears are caused to orbit around the sun gear. However, because the planet gears engage the oscillating sun gear and because the planet gear cluster with its support (and also preferably a counterweight mass added thereto) have inertia, vibration of the sun gear is transmitted to the ring gear and thereby to the multifingered shaker drum as desired.

Still other novel features reside in the novel means for securing the fingers to the shaker or tubular member. Such means including keyhole-shaped apertures, or the like, in the tubular member. Each aperture has an enlarged portion sufficient to pass an enlargement on the inner end of the finger, which enlargement may comprise a nut threaded on the finger. With the nut inserted through the enlarged portion of the aperture the finger is moved transversely of itself downwardly into a smaller recess or slot portion of the aperture, and the nut is then tightened against the inside wall of the tubular member. As the nut advances, an enlargement on the finger intermediate its ends is drawn against the outside face of the tubular member so as to clamp the finger in position.

These and other features, objects and advantages of the invention will become more fully evident from the following description thereof with reference to the accompanying drawings.

Figure 1:
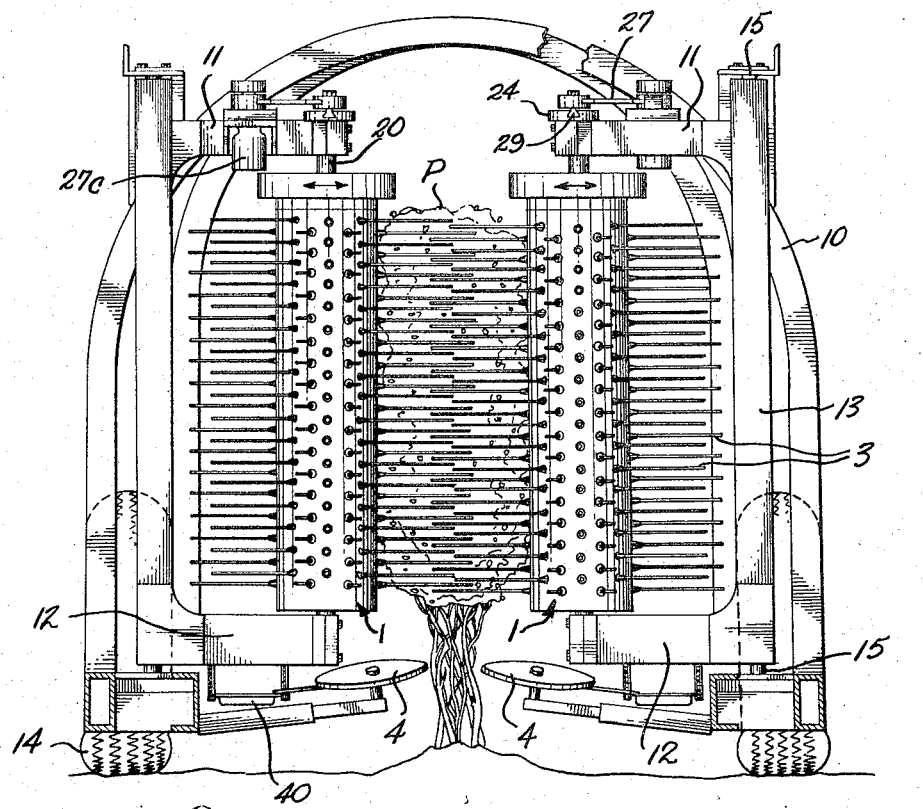
FIGURE 1 is a front view of the harvester, showing the shakers engaged with the opposite sides of the row of plants and showing the chassis partly in section.
Figure 7:
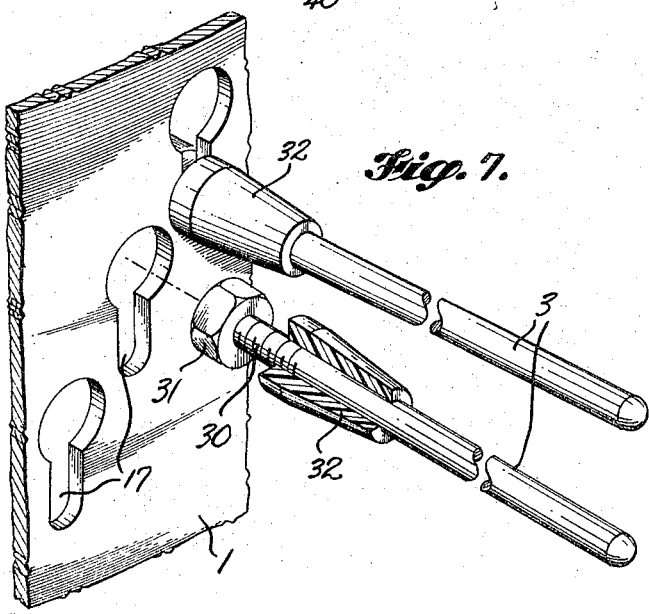
FIGURE 7 is an isometric view of a sectional portion of the tubular base and two fingers of a shaker, one finger being shown removed from its keyhole-shaped aperture and the other finger being in the installed position (sheet 1).

As shown herein the harvester comprises a carriage frame 10 having general resemblance to the frame 10 of a conventional lumber carrier in that it overarches its load or operating elements and in this case overarches the row of berry plants P. This carriage comprises wheels 14 which run upon the ground between the rows of plants, a suitable motive power means, such as a gasoline engine and drive transmission (not shown) coupled to one or more of the wheels 14, berry-dislodging means represented in this case by the opposing shakers 1 which work on respectively opposite sides of the row of plants, and a suitable collecting means, in this case two series of overlapping disks 4 and associated endless conveyors 40 for receiving, collecting and conveying the harvested berries dropping from the vines. Various details of the machine, including the operating means alluded to briefly hereinabove, together with associated mechanisms and components, are omitted from the drawings and from this description because they comprise no part of the present invention, or they may be of any suitable or conventional form.

Figure 2:
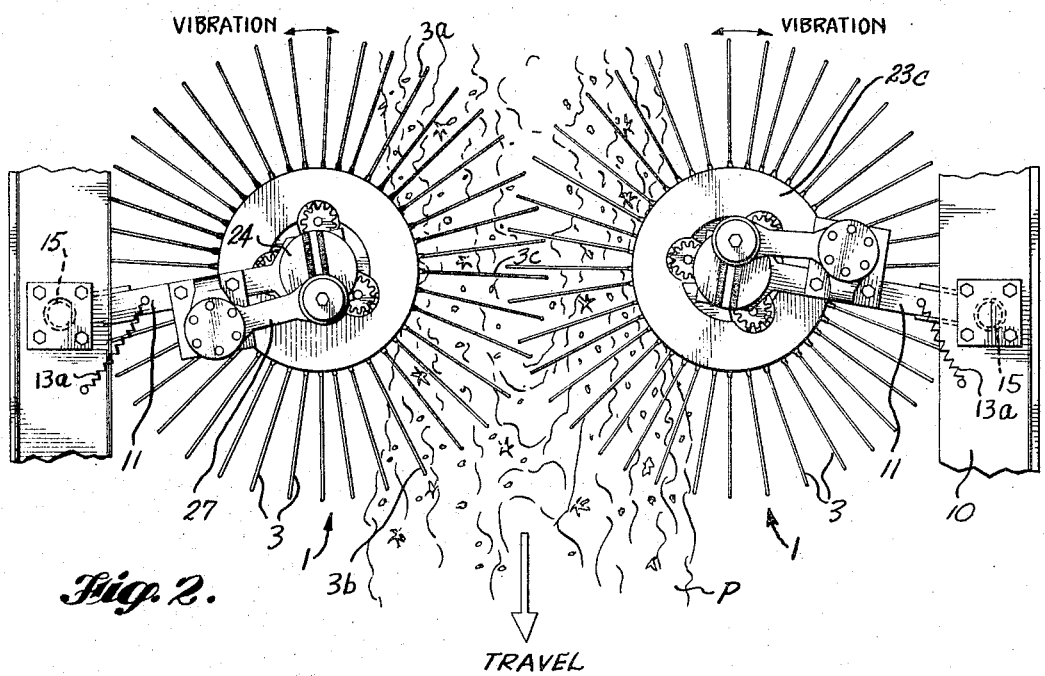
FIGURE 2 is a plan view of the shakers and supporting segments of the carriage, substantially as they would appear in FIGURE 1.
Figure 3:
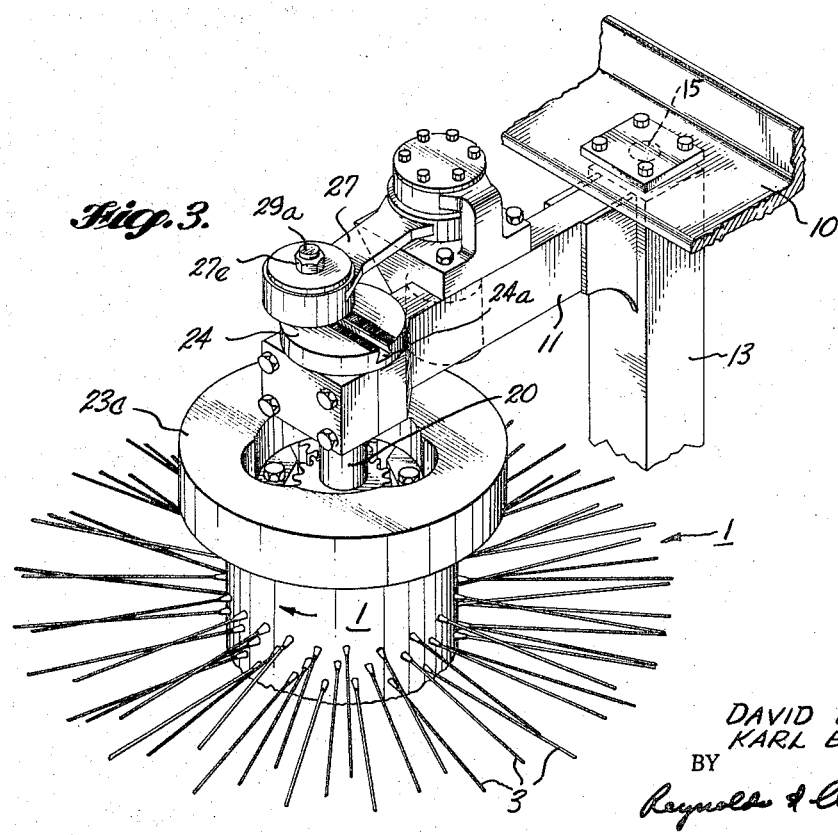
FIGURE 3 is an isometric top view of the upper end of a shaker and its mount.
Figure 4:
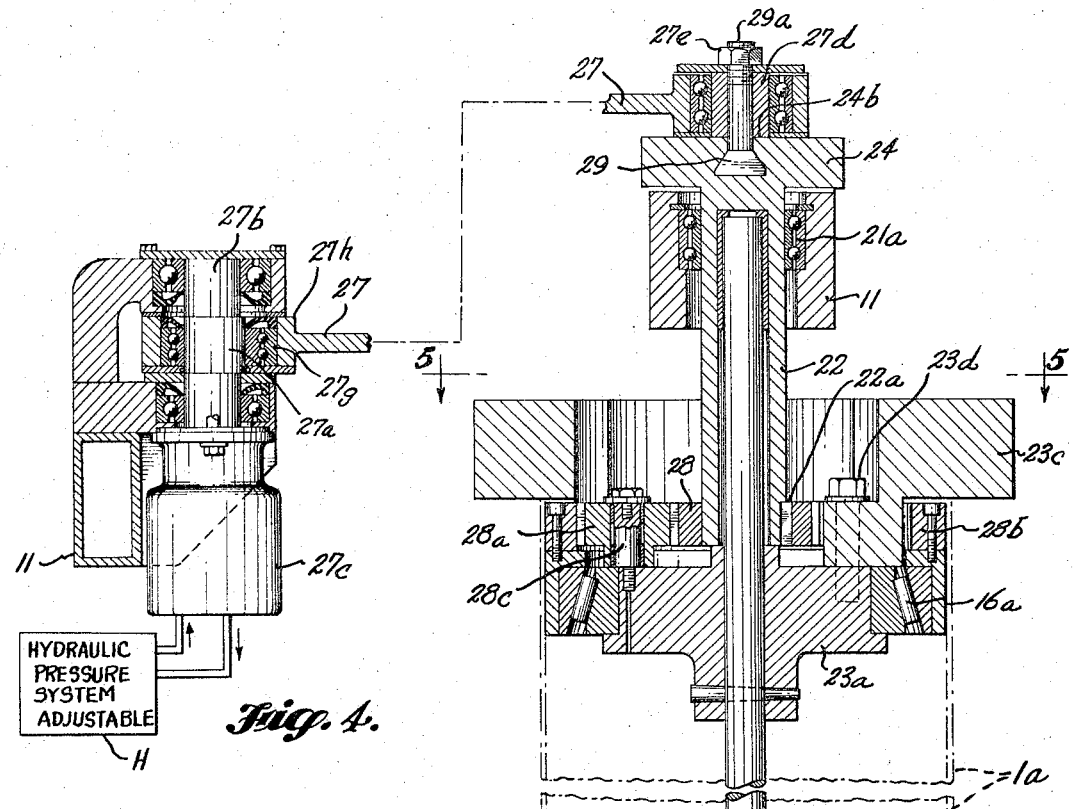
FIGURE 4 is an axial sectional view of a shaker and its mount, taken at the line 4—4 of FIGURE 5.
Figure 5:
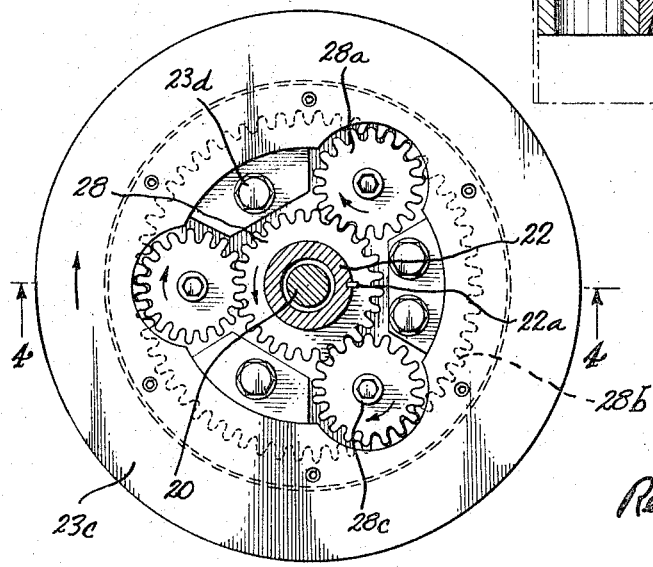
FIGURE 5 is a sectional plan view of a shaker taken on line 5—5 in FIGURE 4.
Figure 6:
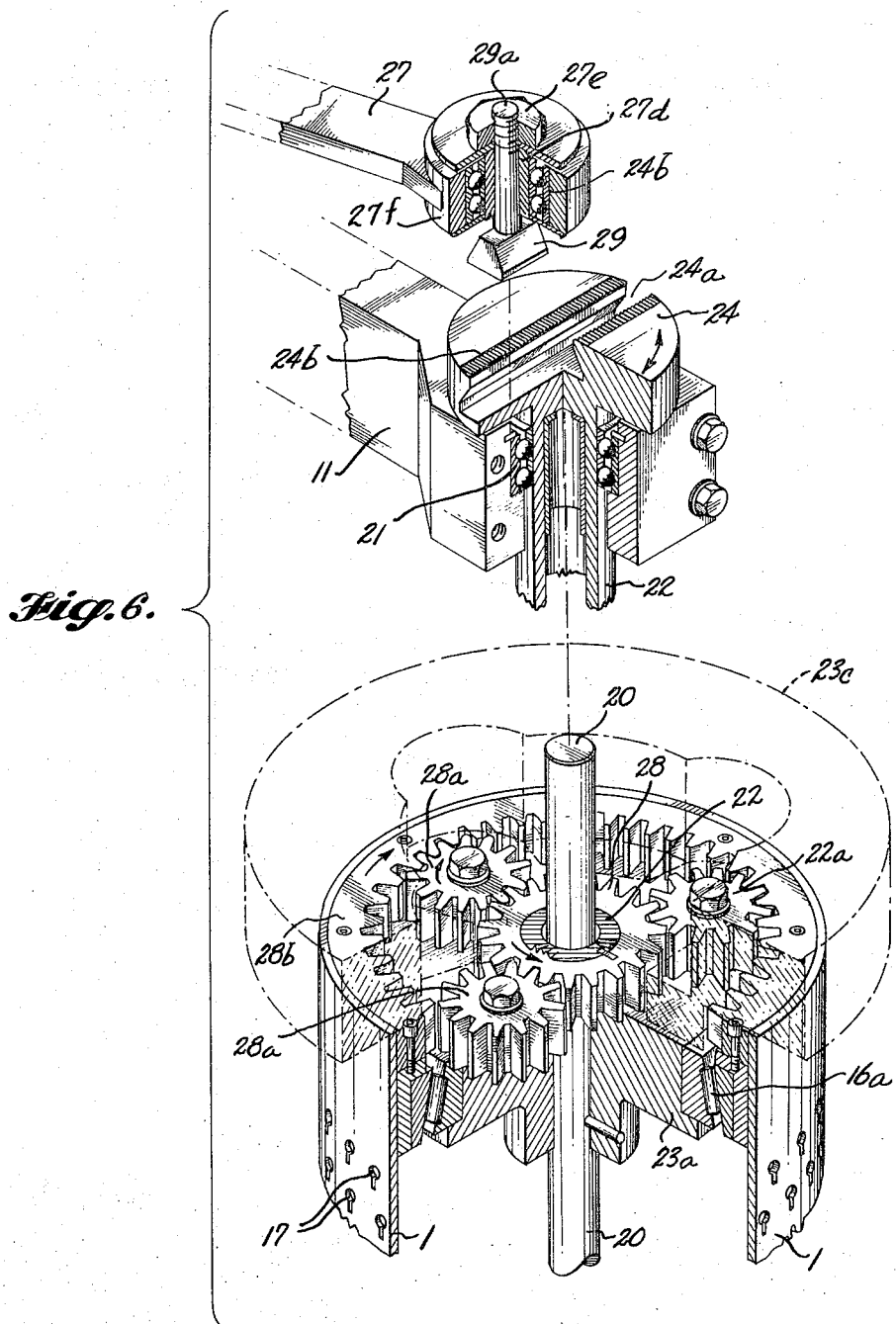
FIGURE 6 is an exploded top isometric view of the upper end portion of a shaker together with a portion of its mount, certain parts thereof being shown in section or broken away for illustration of constructional details.

As illustrated, the harvester has two multifingered generally cylindrical shakers 1. The tubular member 1a of each shaker is of thin-wall material of minimum weight consistent with strength so that, with its fingers and other appurtenances, it presents a minimum polar moment of inertia when driven for vibration about its rotational axis. The two shakers drum 1a are supported uprightly at opposite sides of the machine so as to engage opposite sides of the row of plants P. The fingers 3 which project radially from the tubular members have sufficient length as to be capable of insertion into the vines to a depth assuring that all portions of the vines are subjected to their vibrative action. The shakers are so mounted that they can revolve freely in response to the reaction forces of the fingers 3 engaging the plants during movement of the harvester along the row. Thus the shakers are caused to revolve approximately at the same speed as the ground speed of the harvester. In addition to its progressive revolution caused by otherwise coordinated with advance of the harvester, each shaker is positively oscillated in a rotational sense and at relatively high speed so as to superimpose a rotative vibration on the circumferentially orbiting motion of the fingers. At the frequency and amplitude of vibration used, the vibrative motion speed of the fingers greatly exceeds the speed at which the fingers progress orbitally around the shaker axes. The resultant vibration of the berry plants being engaged by the large number of fingers of each shaker is effective to dislodge practically all of the ripe berries. Such rotatively oriented vibration of the shaker fingers caused by the progressively revolving shaker assembly subjects the individual plants to vibrative agitation in generally horizontal directions which change progressively during the period of contact. This is shown best in FIGURE 2 wherein fingers 3a and 3b entering and leaving the plants are vibrating generally transverse to the row length, whereas finger 3c at an intermediate position is vibrating generally lengthwise of the plant row. Each plant is thus subjected to vibrations in a plurality of directions and it is found that this results in substantially complete dislodgment of the ripe berries on a selective basis when the frequency and amplitude of vibration are correctly adjusted.

Each shaker 1 is rotationally mounted upon and between an upper arm 11 and a lower arm 12. The two arms project from the adjacent side of the carriage frame 10 inwardly in generally parallel relationship towards the opposing shaker arms. The base ends of the arms are each rigid with and are joined by an upright member 13 which is pivotally mounted at 15 to turn on an upright axis at the side of the frame 10. A spring 13a urges the arms and thereby the shaker 1 inwardly against the side of the row of plant P while permitting the shaker to yield readily as necessary in order to pass a plant clump or post of appreciable bulk without damaging the shakers or the plants.

The upper end of an upright shaft 20 associated with each shaker is rotatively received within a sleeve 22 serving also as a shaft. The sleeve 22 is journaled in thrust bearings 21a in the upper arm 11. The lower end of the shaft 20 is journaled in a sleeve bearing 21b carried by the lower arm 12. An upper head 23a and a lower head 23b are pinned to the shaft 20. The tubular member 1a comprising the shaker base revolves freely about the common axis of shafts 20 and 22, and is mounted upon axial thrust roller bearings 16a and 16b interposed between the tubular member 1a and the two heads 23a and 23b, respectively.

At its lower end sleeve-shaft 22 carries a sun gear 28 keyed to it by the key 22a. Planet gears 28a engaging the sun gear are rotationally mounted on the shaft pins 28c threaded into the upper head 23a to be supported thereby. A ring gear 28b mounted internally within the upper end of the tubular member 1a meshes with the planet gears 28a, so that as the shaker 1 rotates by its engagement with the plants the planet gears 28a are caused to rotate orbitally around the common axis of the shafts 20 and 22. An annular counterweight 23c is secured by bolts 23d to the head 23a and thereby adds mass to the assembly comprising the head 23a and the planet gears 28a orbiting with rotation of the shaker 1. This added mass assists in the positive transmision of ocillatory vibration from the sun gear 28 through the planet gears to the ring gears and thereby to the tubular member 1a. By adding momentum to the planet gears in their successive orbital positions the counterweight 23c permits rotational vibration of the sun gear to be transmitted to the ring gear in preference to merely vibrating the assembly of planet gears orbitally about the shaker axis.

In order to vibrate the sun gear 28 rotationally, the upper end of sleeve-shaft 22, journaled by bearings 21 in the arm 11, carries a head 24 having a transverse dovetailed slot 24a therein with serrations 24b extending along the slot rim faces on each side. A gib 29 slidably retained in the slot 24a supports a crank pin 29a retained by a nut 27e in the collar 27f on one end of connecting rod 27. A sleeve 27d surrounding the pin 29a has a serrated lower end face which projects below the lower face of the collar 27f to engage the serrations 24b and is pressed into such engagement by tightening of the nut 27e. Loosening of the nut 27e permits adjustive movement of the gib 29 lengthwise of the slot 24a in order to vary the length or throw of the crank arm defined between the axis of shaft 22 and the axis of pin 29a. Antifriction bearings 24b interposed between the sleeve 27d and the collar 27f permit the pin 29a to rotate within the collar 27f as the connecting rod 27 oscillates.

Connecting rod 27 has a collar 27h on its opposite end receiving, in antifriction bearings 27g, the eccentric portion 27a of a crankshaft 27b. A motor 27c, preferably comprising a hydraulic motor connected to the hydraulic pressure system H as shown, rotates the crank shaft 27b at a selected speed determined by the controllable adjustment or setting of the hydraulic pressure system, so as to vary the frequency of oscillation of the connecting rod 27 and thereby the resultant frequency of rotary oscillation of the shaft 22 effected by the crank mechanism 29a, 29, 24, etc. The vibrations thus imparted to the sun gear 28 may be varied as to frequency and, by adjustment in the position of the gib 29 along the slot 29a, as to amplitude.

Typically, the motor 27c will be driven at such a speed that the shaker 1 is vibrated at a frequency of the order of 1,000 cycles per minute and the crank mechanism will be so adjusted that the amplitude of finger vibration is of the order of a half inch or less. However the system is typically designed so as to permit the frequency to be varied between 500 and 2000 cycles per minute and the amplitude between substantially zero and an inch.

As previously stated, the mass added to the planetary gear transmission head 23a by the counterweight 23c insures positive transmission of vibrational forces from the sun gear 28 to the ring gear 28b through the medium of the planet gears 28a. At the same time, however, this added mass in no way increases the polar moment of inertia of the mass of the shaker assembly which must be vibrated in this manner and it therefore does not create a problem of transmitting vibration forces to the machine frame. The concept of vibrating the shakers rotationally about their rotational axes in itself inherently avoids undue vibrational stresses in the shaker supports because the rotary system is dynamically balanced within itself. Moreover the power requirement to vibrate the shaker fingers of an assembly of a given size or capacity is reduced in this mode of vibration as compared with vibration longitudinally or transversely of the shaker axis due to the fact that polar moment of inertia about the rotational axis may be made materially less than the inertia thereof for a rectilinear mode of vibration.

It is important that the shaker assembly be strong, yet of light-weight construction so as to present a minimum mass to rotary motion. It is further important that the fingers be readily installed and removed in the field if desired since they may become damaged or their replacement may be necessary for changing to fingers of different shape or size or for changing the distribution density of fingers over the surface of the drum, depending upon plant growth, etc.

As shown, the individual fingers 3 comprise elongated rods of a suitable metal such as tempered steel or the like. These fingers are not of whip-like flexibility because a substantial degree of stiffness is necessary for them to displace the plants. However they are required to bend to some extent without damage owing to the stresses to which they may be subjected. The inner end of each finger to be anchored to the tubular member is threaded and carries an enlargement or nut 31. This nut may be rotated and thus advanced or retracted toward and from the stop 32 which is fixed on the rod at a given position along its length so as to serve as a clamping element opposite the nut 31. As shown, this stop is also threaded on the finger but extends toward the tip of the finger beyond the thread cut in the latter so as to provide added stiffness to the finger. A keyhole-shaped aperture 17 in the wall of tubular member 1 has an upper enlarged portion sufficiently large to pass the nut 31, and an adjoining portion of reduced width depending therefrom of a size sufficient to accommodate the body of the rod 3, yet not sufficiently large to pass the nut 31 or the stop 32. Thus, by inserting the finger endwise to pass the nut 31 through the enlarged portion of the aperture and then moving the rod downwardly transversely to its length into the base of the narrow slot portion of the aperture, the rod may be clamped securely in place by tightening of the nut 31 against the inside wall of the tubular member 1 so as to draw the stop 32 against the outside wall thereof. Removal of any finger following a reverse process is accomplished as quickly and simply as its initial installation. Because the narrow slot portion of the aperture depends from the enlarged portion thereof and extends in a direction transverse to the circumferential direction of vibration of the tubular member, there is no tendency for the nut to loosen or for the rod to become dislodged from the tubular member.

These and other features and aspects of the invention will be recognized from the foregoing description thereof by reference to its presently preferred embodiment as shown.

We claim as our invention:

1. In a berry harvester comprising a carriage movable progressively along a row of berry plants, a pair of rotary generally cylindrical shakers disposed in the harvester opposingly to engage the opposite sides of the row of berry plants as the harvester traverses the length of the row, said shakers including a plurality of plant-engaging finger elements projecting generally radially outwardly therefrom at intervals lengthwise and circumferentially thereof, means mounting said shakers to permit them to revolve freely about upright axes progressively accompanying such advance of the harvester along the row, thereby to permit successive engagement of said elements with the plants being traversed by the harvester, and means to oscillate the shakers rotatively about their respective axes at an amplitude and frequency producing speed of vibrative circumferential motion of said elements which is at least several times the speed of their progressive circumferential motion.

2. The harvester defined in claim 1, wherein the opposing shakers individually comprise an elongated generally cylindrical tubular member having wall apertures therein for removable mounting of the finger elements, support means at top and bottom of each tubular member mounting the same to be freely rotative about its longitudinal axis said support means for each tubular member being interconnected and movably mounted on the carriage to permit translational shifting of the tubular member toward and away from the opposing member.

3. The harvester defined in claim 2, wherein the means to oscillate the individual shakers comprises an element rotationally engaged with the tubular member to be driven in rotation by progressive rotation of the tubular member, a drive motor, and an associated reciprocative means operable by the motor and connected to said element to accelerate the rotation of said element first in one direction and then in the other accompanying driven rotation of said element by said tubular member.

4. The harvester defined in claim 3, wherein the tubular member has a ring gear mounted thereon, and the element rotationally driven by the tubular member comprises a planet gear engaged with said ring gear, and means having mass to support the planet gear to rotate and, in so rotating, to orbit around the axis of the tubular member, and wherein the associated reciprocative means operable by the motor comprises a sun gear engaging the planet gear in a planetry gear system, and a reciprocative drive means interconnecting the motor and the sun gear and converting rotation of the motor into rotative oscillation of the sun gear about a position which remains relatively stationary accompanying progressive rotation of the shaker.

5. The harvester defined in claim 4, wherein the last-mentioned means comprises a crank connected to the sun gear, a link pivotally connected to the crank, and an eccentric rotatively driven by the motor and connected to the link for oscillating the crank.

6. The harvester defined in claim 5 and means to vary the effective length of the crank and thereby the amplitude of vibration of the sun gear.

7. The harvester defined in claim 5, wherein the support means for mounting the tubular members comprise upper and lower arms projecting inwardly from respectively opposite sides of the carriage toward the row of berry plants, means mounting and interconnecting the upper arm with the lower arm at each side of the carriage to constrain such arms to swing conjointly on an upright axis with the tubular member carried therebetween for bodily movement of the latter into and from engagement with the berry plants, said motor, eccentric, link and crank being carried with one of the arms and means yieldably urging said arms inwardly toward the plants 8. In a berry harvester comprising a carriage movable progressively along a row of berry plants, a pair of opposing rotary shakers disposed in the carriage to engage the opposite sides of the row of berry plants, means mounting said shakers to permit them to revolve freely about upright axes progressively accompanying such advance of the harvester, and means to oscillate the shakers rotatively about their respective axes accompanying progressive revolution of the shakers.

9. The berry harvester defined in claim 8, further including in operative association with each shaker two coaxially arranged members, means rotatively supporting the shaker upon one such member to permit rotation of the shaker freely about the axis thereof, a planetary gear system including a sun gear connected rotatively with the other such member, a ring gear mounted upon the shaker and a planet gear interengaged between the ring gear and the sun gear and means having mass supporting the planet gear on one of said members for rotation of the planet gear on its own axis and for orbital movement about the first-mentioned axis, and wherein the means to oscillate the shaker includes drive means for rotatively oscillating one of the members.

10. The berry harvester defined in claim 9, wherein the member to which the sun gear is rotatively connected is the member which is oscillated.

11. The berry harvester defined in claim 9, wherein the individual shakers comprise a relatively thin-wall tubular member mounting a plurality of elongated radially projecting fingers at respective locations distributed heightwise and circumferentially of the tubular member.

12. In a berry harvester including a carriage movable along a row of berry plants and a rotary plant-engaging shaker means mounted on the carriage and including an elongated tubular member with a plurality of elongated fingers projecting radially from said tubular member at locations distributed about the circumference and length of the tubular member, each such finger having an enlargement element at its inner end and a stop element intermediate its ends, at least one of said elements being adjustively movable along the finger to permit clamping the wall of the tubular member wall releasably between such elements, the tubular member having a plurality of apertures therein to receive the respective fingers, each such aperture having an enlarged portion to pass the enlargement and a contiguous slot portion of lesser width sufficient to receive the finger but insufficient to pass either of said elements.

13. The combination defined in claim 12, wherein the elongated fingers each comprise a rod threaded at its inner end portion, the enlargement element comprising a nut threaded on such inner end.

14. The combination defined in claim 13, wherein the stop element is also threaded on the inner end portion of the rod and extends toward the latter's outer end a distance beyond the thread therein so as to impart stiffening to the rod.

15. In a berry harvester, having a ground traversing carriage movable along a row of berry plants, and means to catch berries shaken from the plants, a pair of upright cylinders spaced laterally to engage the opposite sides of a row of berry plants as the harvester traverses the length of the row, an upright shaft disposed axially of each cylinder, means mounting each shaft for circumferential oscillation, bearing means mounting each cylinder for free revolution about the axis of its shaft, as the cylinder advances along the row, a first crank means carried by each mounting means, a second crank means carried by each shaft, an operative connection between said two crank means for the respective shafts, for oscillating the second crank means from the first crank means, means interconnecting each shaft with the corresponding cylinder, to communicate oscillation of the second crank means to the cylinder, and means to vary the throw of the second crank means to vary the amplitude of the cylinder's oscillation.

16. In a fruit harvester, a free-rolling plant shaker having a plurality of plant-penetrating fingers, a carriage for advancing the shaker along a row of plants in free rolling contact therewith, and means to oscillate the shaker rotatively as it rolls against the plants, said means comprising first and second rotational members coaxial with the rotary shaker, means to oscillate the first member rotationally about a given position of rotation, transmission means carried for bodily rotation of the second member and rotatively interconnecting the shaker and first member so as to transmit the first member's vibrations to the shaker accompanying rotation of the shaker, hence bodily rotation of said transmission means.

17. In a fruit harvester, an elongated rotatively oscillatable shaker comprising an elongated tubular member of a diameter which is large in relation to its wall thickness, means mounting such tubular member by its ends for progressive rotation and including vibrational drive means for oscillating such tubular member during such progressive rotation, said tubular member having numerous apertures in the wall thereof at locations distributed lengthwise and circumferentially thereof, and a plurality of plant engaging fingers removably mounted in the respective apertures to project radially outward from the tubular member.

18. The combination defined in claim 17, wherein the oscillations of the tubular member are rotational about its axis of progressive rotation and the apertures are of generally keyhole shape including an enlarged upper portion and a narrower depending portion, and the removable fingers have enlargements on their inner ends longitudinally spaced apart to accommodate the tubular member's wall thickness therebetween, the endmost enlargement being small enough for insertion and removal through the upper portion of a keyhole aperture.

References Cited
UNITED STATES PATENTS 3,184,908   5/1965   Rust _____ 56—330

ABRAHAM G. STONE, *Primary Examiner.*

RUSSELL R. KINSEY, *Examiner.*